Figure 1:
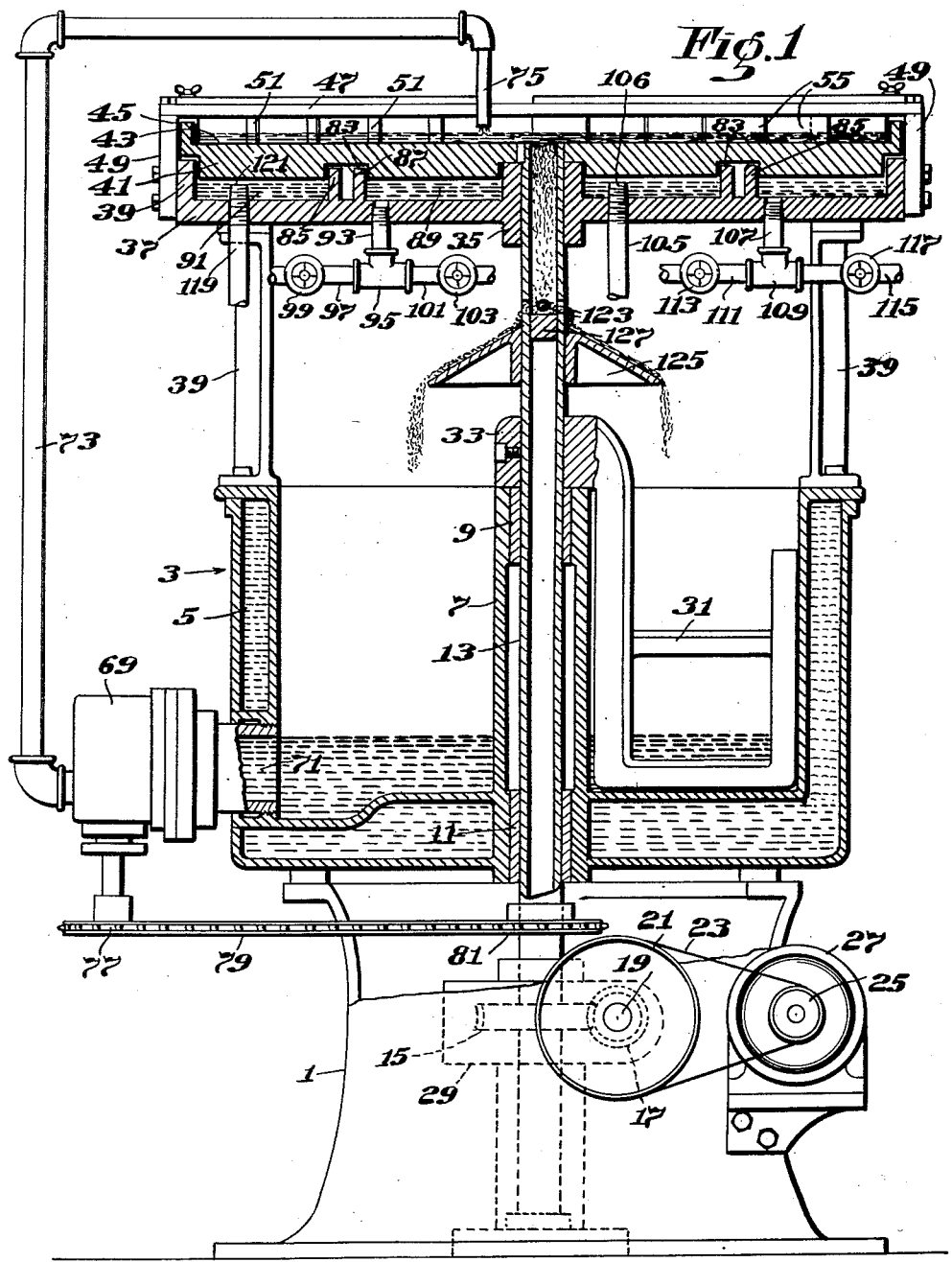

Oct. 31, 1933.  J. W. GREER ET AL  1,932,931
CONFECTIONERY DIPPING PROCESS AND APPARATUS
Filed June 13, 1930  2 Sheets-Sheet 1

INVENTORS:
Jesse W. Greer
BY Fred W. Greer
Henry T. Williams
ATTORNEY

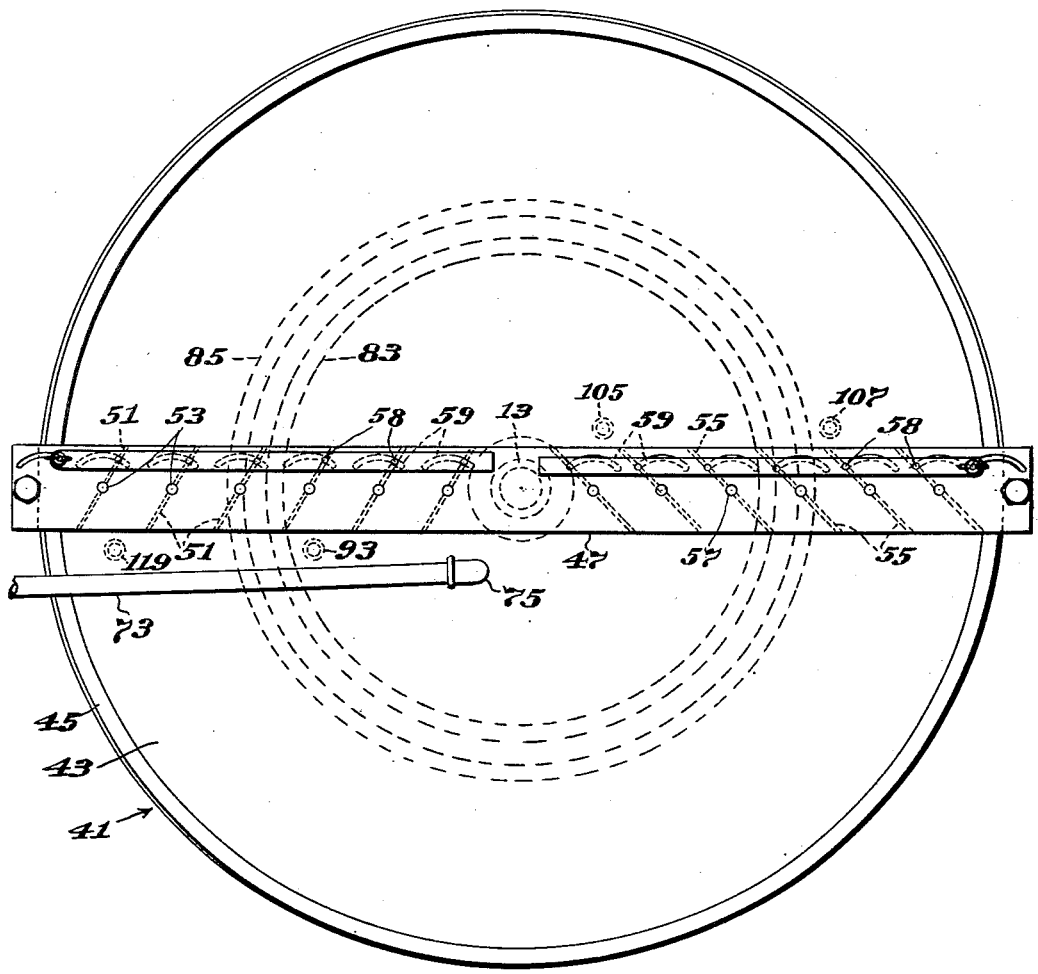

Patented Oct. 31, 1933

1,932,931

UNITED STATES PATENT OFFICE 1,932,931

CONFECTIONERY DIPPING PROCESS AND APPARATUS

Jesse W. Greer, Cambridge, and Fred W. Greer, Belmont, Mass.

Application June 13, 1930. Serial No. 460,885

6 Claims. (Cl. 91—4)

The invention to be hereinafter described relates to a process and apparatus for use in hand dipping confectionery centers.

Heretofore the apparatus generally used in hand dipping centers in chocolate has comprised an ordinary table having an opening receiving a tank having its top flush with the upper surface of the table, the latter being sufficiently large to provide a shelf between the tank and an edge of the table.

The hot chocolate at a temperature of about 95° F. is usually carried by hand and poured into the tank which ordinarily holds about thirty pounds. The hand dipper dips four or five handfulls of chocolate from the tank and deposits the same upon the shelf. The chocolate at said temperature is too warm for dipping candy centers, and therefore the hand dipper beats, stirs and works the chocolate back and forth over the table until the air and the table have cooled and tempered it to a temperature sufficiently low for dipping, which may be about 85° F.

When the chocolate has been tempered, the hand dipper drops and stirs the candy centers therein to coat them with chocolate. A tray or plaque with a glazed sheet of paper thereon is brought to the dipper who places the coated centers on the tray to cool and harden. This process is repeated until the supply of chocolate on the table is so depleted that it is difficult to coat the centers. Then the dipping operation ceases, and more chocolate is dipped from the tank, placed upon the table and tempered, and centers are dipped as before. After this process has continued for a few hours, a crust of from one to ten pounds of chocolate forms on the table around the dipping space, due to the cooling effect of the air and the table. This crust is scraped from the table and put into a kettle to re-melt, and then is available for dipping. The melting of the crust requires two or three hours, and is an expensive operation, due not only to the labor involved, but to a certain amount of scrap which it is impossible to eliminate. The steps above described constitute essentially a hand process.

In our copending application Serial No. 459,038, filed June 3, 1930, a process and apparatus for dipping confectionery centers are disclosed and claimed which will very materially reduce the time, labor and cost of hand dipping, and with economy in the amount of chocolate or other coating used. In the practice of the process set forth therein, the hot liquid chocolate is stirred and mixed on a table to temper the same, and the coating is fed to one or more rotary plates which serve as hand dipping stations. The chocolate is not only fed continuously to said plates, but some of the chocolate is continuously removed therefrom, so that it does not remain on said plates sufficiently long to form the crust referred to. The temperature of the chocolate is lowered on the table somewhat beneath that for proper dipping, and then the temperature is raised on the plates to the proper temperature for dipping, in order to obtain a coating on the centers with a high gloss surface.

A purpose of the present invention is to deliver hot chocolate to a zone on the table where it is stirred, mixed and tempered to a temperature somewhat beneath the proper temperature for dipping, and progressively to feed the tempered chocolate to another zone on the table where the temperature thereof is raised to the proper degree for dipping, the latter zone serving as a station or stations at which the centers are dipped in the coating. The coating is worked back and forth relatively to the center of the table, but with a progressive outward movement from the inner zone to the outer zone. The chocolate thus kept in motion does not have opportunity to form crust, but always is in condition for dipping.

Another purpose of the invention is to associate with the dipping table a kettle in which chocolate is maintained in melted condition, and is continuously fed therefrom to the table. It is desirable that the chocolate shall be maintained at a uniform depth on the table, and therefore provision is made for returning excess chocolate above this depth to the kettle.

With the aforesaid and other purposes in view, the character of the invention may be best understood by reference to the following description of the process and apparatus shown in the accompanying drawings, wherein:

Fig. 1 is a view partly in section and partly in elevation of apparatus embodying the invention; and Fig. 2 is a plan of the apparatus shown in Fig. 1.

Referring to the drawings, the apparatus shown therein as one good form of the invention, comprises a hollow base 1 supporting a kettle 3 having a steam jacket 5. Rising centrally from the base of the kettle is a tubular post 7 provided with an upper bearing 9 and a lower bearing 11 in which a hollow shaft 13 is journalled. The lower end of the shaft projects beneath the casing into the hollow base, and has a worm gear 15 fast thereon meshing with a worm 17 on a shaft 19 carrying a pulley 21 connected by a belt 23 with the driving pulley 25 of an electric motor 27 mounted on the base. The worm gear and worm are enclosed in a casing 29.

The chocolate in the kettle is stirred by a paddle 31 of general U-shaped form and having a hub 33 fast on the hollow shaft. The latter projects up beyond said hub, and is journalled in a bearing 35 in a plate 37 mounted on posts 39 standing on and secured to the kettle, said plate being of circular form and having an upstanding rim or flange 39.

Above and spaced from the plate 37 is a rotary circular table 41 having a flat surface 43 and an upstanding rim or flange 45, said table being fast on the upper end of the hollow shaft. Above and extending across the table is a fixed bar or carrier 47 having its opposite ends secured to brackets 49 secured in turn to the plate flange 39. A series of scrapers or stirrers 51 at one side of the shaft are each provided with pintles 53 projecting up therefrom through holes in the bar 47, and a similar series of scrapers or stirrers 55 at the opposite side of said shaft have pintles 57 projecting up through holes in the bar. Each scraper is provided with a pin 58 projecting up through an arcuate slot 59 in the bar and into a hole in a slide 61 on the bar, two such slides being provided, one for each bar. By moving the slides along their respective bars the angularity of the scrapers may be adjusted, as more fully hereinafter described. To secure the slides in different positions of adjustment, each is provided with a bolt 63 entered through a hole in the bar and an arcuate slot 65 in the slide, said bolt being provided with a wing nut 67 which may be tightened to secure the slide to the bar.

To conduct the hot liquid chocolate from the kettle to the upper surface of the table, a pump 69 is provided having a large inlet 71 communicating with the kettle. A pipe 73 extends from the pump up above the table, over one side of the table, and has a discharge end 75 adjacent the center of the table. To drive the pump, it is provided with a sprocket wheel 77 connected by a sprocket chain 79 with a sprocket wheel 81 on the tubular shaft 13 above referred to.

Projecting up from the plate 37 are an annular flange 83 and an adjacent annular flange 85, the upper margins of said flanges extending into an annular recess 87 in the bottom of the table. The table has an inner zone beneath which is a jacket 89, and an outer zone beneath which is a jacket 91. Communicating with the jacket 89 is a pipe 93 connected to a T-union 95. A pipe 97 is connected to one end of the union and has a valve 99, and a pipe 101 is connected to the other end of the union and has a valve 103. The pipe 97 may communicate with a supply of water or other cooling fluid, and the pipe 101 may communicate with a source of steam. When the valve 99 is open, and the valve 103 is closed, water will be fed to the jacket 89; and when the valve 103 is open and the valve 99 is closed, steam will be fed to said jacket. A drain pipe 105 projects up through the plate 37 into the jacket 89, and has an end 106 above the bottom of the jacket controlling the level of the water therein.

A pipe 107 communicates with the jacket 91 and is connected to a T-union 109. A pipe 111 is connected to this union and is provided with a valve 113, and a second pipe 115 also is connected with said union and is provided with a valve 117. The pipe 111 may be connected with a supply of water or other cooling liquid, and the pipe 115 may be connected with a source of steam. When the valve 113 is open and the valve 117 is closed, water will be supplied to the jacket 91; and when the valve 117 is open and the valve 113 is closed, steam will be supplied to said jacket. A drain 119 projects up through the plate 37 into the jacket 91 and has an end 121 above the bottom of the jacket 91 controlling the level of the water therein.

As stated, it is desirable to maintain a uniform depth of chocolate on the table. Any excess above the proper level may flow down through the hollow shaft 13, pass through ports 123 in said shaft, over a deflector 125 fast on the shaft, and thence back into the kettle. A plug 127 in the shaft beneath the ports prevents the chocolate from flowing down in the shaft beyond the deflector.

In operation, hot chocolate is pumped from the kettle up through the pipe 73 and delivered to the surface of the table 41. The latter is rotated, thereby carrying the chocolate past the scrapers. The scrapers of one series may be set at an angle, such for example, as 30° relatively to the length of the scraper carrying bar, to feed the chocolate inwardly on contra-clockwise rotation of the table (Fig. 2), and the scrapers of the blades of the other series may be set at a greater angle, such for example, as 45° with relation to the length of the bar, to feed the chocolate outwardly. The consequence is that on rotation of the table the chocolate will be worked inwardly and outwardly, but with a progressive outward movement, thereby thoroughly stirring and mixing the chocolate and removing bubbles therefrom.

It is desirable that the chocolate shall be delivered to the table adjacent the center thereof at a temperature of about 100° F., that the temperature of the chocolate shall be lowered on the inner zone of the table to a temperature of about 85° F., and that the chocolate fed from the inner zone to the outer zone of the table shall be raised on the latter to a temperature of about 88° F., which is proper for dipping centers.

The hand dippers are stationed about the table, four being conveniently accommodated. Adjacent the table there may be provided shelves for the centers to be coated, and other shelves for the trays having glazed paper thereon for receiving the dipped centers.

At the end of each day's operation, it is desirable that any residual chocolate shall be cleaned from the surface of the table. To accomplish this, steam may be admitted to the jackets to melt the chocolate on the table, and the scrapers may be set so that all of them will feed the chocolate toward the hollow shaft at the center of the table where it will flow down through said shaft into the kettle.

The combined kettle and table constitute a desirable hand dipping machine for use by smaller confectionery manufacturers, and also in plants where centers are to be dipped in a variety of coatings.

While the invention has been described more particularly with reference to dipping chocolate, any other coating may be used.

It will be understood that the invention is not limited to the specific embodiment shown, and that various deviations may be made therefrom without departing from the spirit and scope of the appended claims.

What is claimed is:

1. A process of coating confectionery characterized by feeding liquid coating to a table, stirring and cooling the coating thereon to temper the same, working the coating both outwardly and inwardly on the table while producing a progressive outward movement of the coating to a dipping zone on the table and dipping centers in coating at said outer zone.

2. A process of coating confectionery characterized by feeding liquid coating to a table, stirring and cooling the coating to temper the same, working the coating inwardly and outwardly on the table and to a dipping zone on the table, and dipping centers in coating at said zone.

3. Apparatus of the character described comprising, in combination, a kettle for heating and liquefying coating, a dipping table above the kettle, a hollow shaft projecting up from the kettle through the table, means to feed coating from the kettle to the table, means operable on rotation of said shaft to stir and mix the coating on the table, said shaft being adapted to conduct coating from the table back to the kettle.

4. Apparatus of the character described comprising, in combination, a kettle for heating coating, a shaft, a paddle on the shaft for stirring the coating in the kettle, a dipping table above the kettle, a pump and piping for feeding the coating from the kettle to the table, and means for causing the rotation of the shaft to stir and mix the coating on the table to temper the same.

5. Apparatus of the character described comprising, in combination, a kettle for heating coating, a table above the kettle, a hollow shaft projecting from the kettle up through the table, and means for feeding coating from the kettle to the table, blades for stirring and mixing the coating on the table, said shaft being adapted to drain coating from the table to the kettle.

6. Apparatus of the character decribed comprising, in combination, a kettle for heating coating, a tubular post in the kettle having a bearing, a hollow shaft journalled in said bearing, a paddle on the shaft for stirring the coating in the kettle, a table above the kettle, means to conduct coating from the kettle to the table, and a deflector on the shaft above the bearing, said shaft being adapted to receive coating from the table and having a delivery port above the deflector.

JESSE W. GREER.
FRED W. GREER.